US010557749B2

(12) United States Patent
Tenghamn et al.

(10) Patent No.: US 10,557,749 B2
(45) Date of Patent: Feb. 11, 2020

(54) ISOLATING A PORTION OF ELECTRIC POTENTIALS GENERATED BY A HYDROPHONE INDICATIVE OF PARTICLE MOTION OR PRESSURE

(71) Applicant: PGS Geophysical AS, Oslo (NO)

(72) Inventors: Stig Rune Lennart Tenghamn, Houston, TX (US); Stian Hegna, Oslo (NO)

(73) Assignee: PGS Geophysical AS, Oslo (NO)

( * ) Notice: Subject to any disclaimer, the term of this patent is extended or adjusted under 35 U.S.C. 154(b) by 117 days.

(21) Appl. No.: 15/704,098

(22) Filed: Sep. 14, 2017

(65) Prior Publication Data

US 2018/0106666 A1  Apr. 19, 2018

Related U.S. Application Data

(60) Provisional application No. 62/409,985, filed on Oct. 19, 2016.

(51) Int. Cl.
  *G01H 3/12* (2006.01)
  *G01V 1/38* (2006.01)
  *G01V 1/18* (2006.01)
  *G01V 1/16* (2006.01)

(52) U.S. Cl.
  CPC .............. *G01H 3/12* (2013.01); *G01V 1/164* (2013.01); *G01V 1/186* (2013.01); *G01V 1/38* (2013.01); *G01V 2210/1423* (2013.01)

(58) Field of Classification Search
  CPC ... G01H 3/12; G01V 1/18; G01V 1/38; G01V 1/164; G01V 1/186; G01V 2210/1423
  See application file for complete search history.

(56) References Cited

U.S. PATENT DOCUMENTS

| 3,304,534 | A | 2/1967 | Sykes |
| 3,832,762 | A | 9/1974 | Johnston et al. |
| 4,799,752 | A | 1/1989 | Carome |
| 5,392,258 | A | 2/1995 | Gabrielson et al. |
| 8,730,766 | B2 | 5/2014 | Lambert et al. |
| 9,019,797 | B2 | 4/2015 | Goujon |
| 2003/0218937 | A1* | 11/2003 | Berg .................... G01V 1/3852 367/16 |
| 2006/0133202 | A1 | 6/2006 | Tenghamn |
| 2010/0027375 | A1* | 2/2010 | Barr, Jr. ................. G01V 1/364 367/21 |
| 2010/0054081 | A1* | 3/2010 | Barr, Jr. ............... G01V 1/3808 367/24 |
| 2010/0124149 | A1* | 5/2010 | Barr, Jr. ............... G01V 1/3808 367/24 |

(Continued)

OTHER PUBLICATIONS

Extended European Search Report for related EP Application 17197180.7, dated Mar. 21, 2018 (13 pgs).

(Continued)

*Primary Examiner* — Hovhannes Baghdasaryan
*Assistant Examiner* — Amie M Ndure

(57) ABSTRACT

A first portion of electric potentials generated by a first detector and a second detector of a hydrophone can be isolated, wherein the first portion is indicative of particle motion. A second portion of the electric potentials generated by the first detector and the second detector of the hydrophone can be isolated, wherein the second portion is indicative of pressure.

21 Claims, 7 Drawing Sheets

(56) References Cited

U.S. PATENT DOCUMENTS

2011/0305108 A1* 12/2011 Goujon .................. G01V 1/364
　　　　　　　　　　　　　　　　　　　　　367/24
2013/0042695 A1　2/2013　Barr et al.
2013/0044565 A1* 2/2013　Barr ........................ G01P 15/09
　　　　　　　　　　　　　　　　　　　　　367/20
2015/0192687 A1　7/2015　Goujon

OTHER PUBLICATIONS

Murphy,"Estimation of Acoustic Particle Motion and Source Bearing Using a Drifting Hydrophone Array Near a River Current Turbine to Assess Disturbances to Fish"; Master of Science in Mechanical Engineering, University of Washington, (2015) (52 pgs) https://depts.washington.edu/nnmrec/docs/murphy_paul_thesis.pdf.

Nedelec, et al., "Particle motion: the missing link in underwater acoustic ecology"; British Ecological Society, Methods in Ecology and Evolution. (2016) vol. 7, (pp. 836-842) (7 pgs) http://onlinelibrary.wiley.com/doi/10.1111/2041-210X.12544/pdf.

* cited by examiner

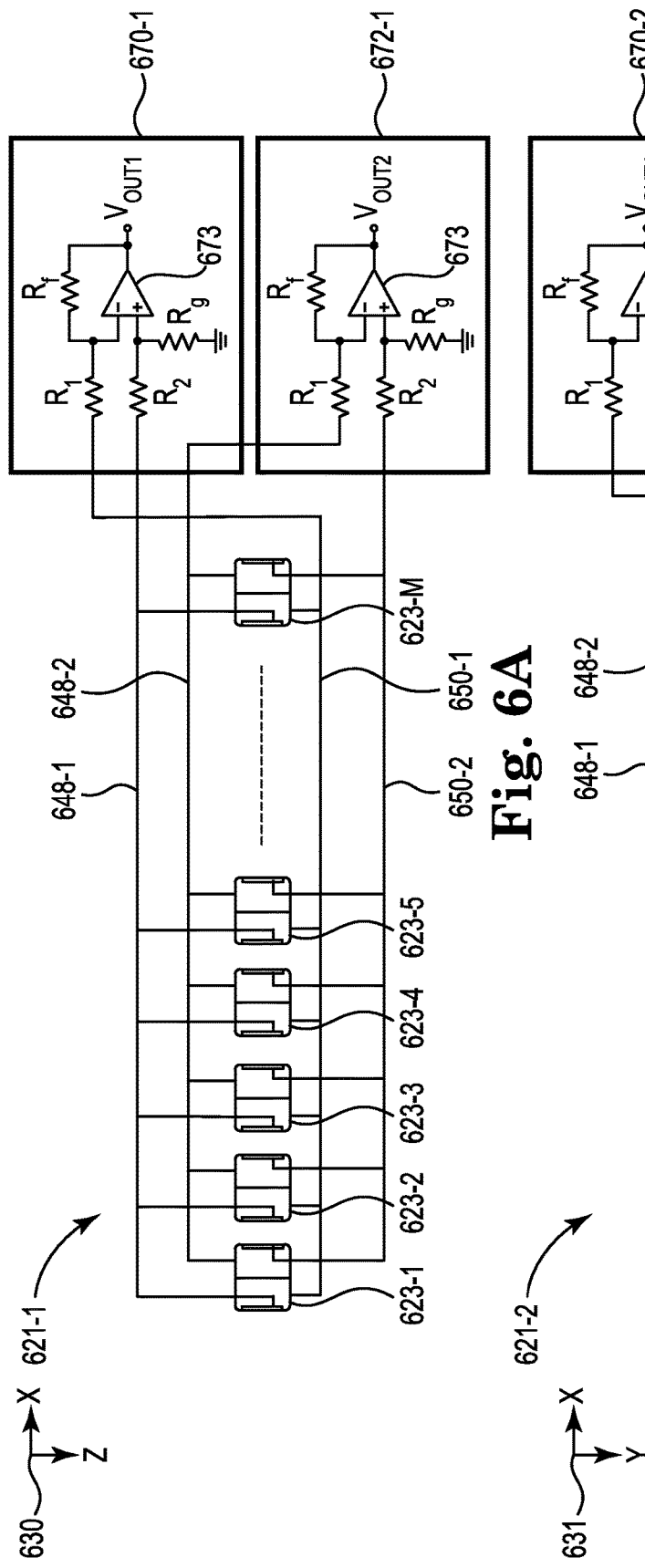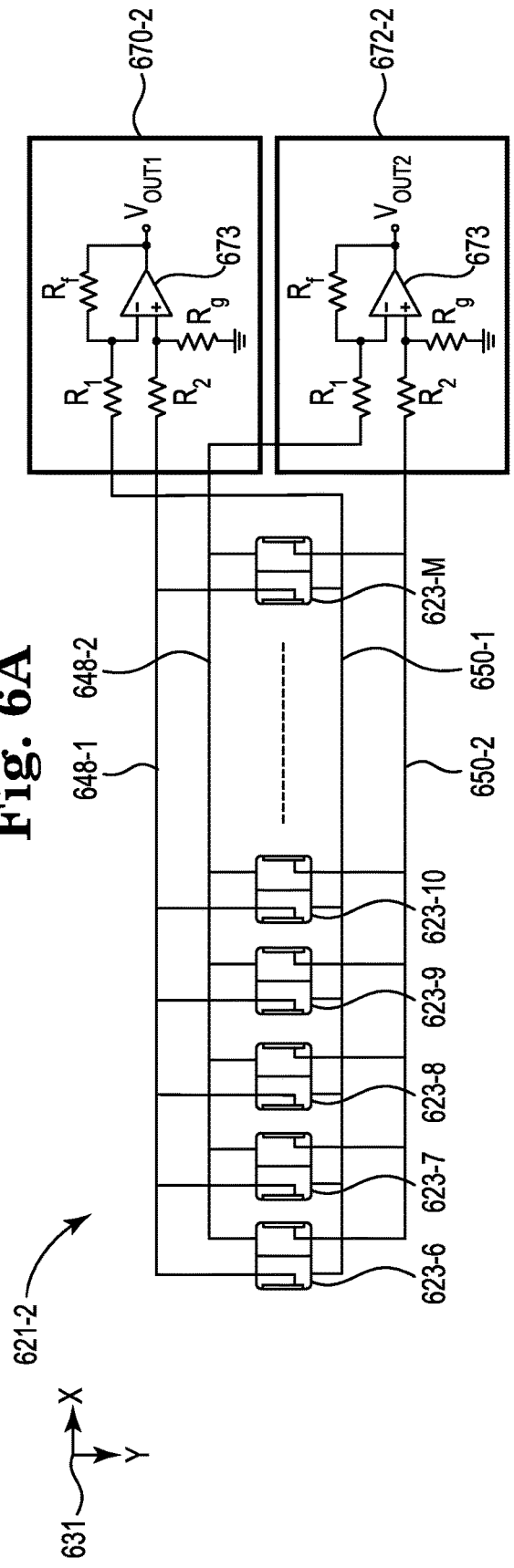

ISOLATING A PORTION OF ELECTRIC POTENTIALS GENERATED BY A HYDROPHONE INDICATIVE OF PARTICLE MOTION OR PRESSURE

CROSS-REFERENCE TO RELATED APPLICATIONS

This application claims priority to U.S. Provisional Application 62/409,985, filed Oct. 19, 2016, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the water surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

BRIEF DESCRIPTION OF THE DRAWINGS

FIG. 6A illustrates a schematic diagram of an array of hydrophones oriented in the xz-plane for measuring particle motion and pressure.

FIG. 6B illustrates a schematic diagram of an array of hydrophones oriented in the xy-plane for measuring particle motion and pressure.

DETAILED DESCRIPTION

Figure 1:
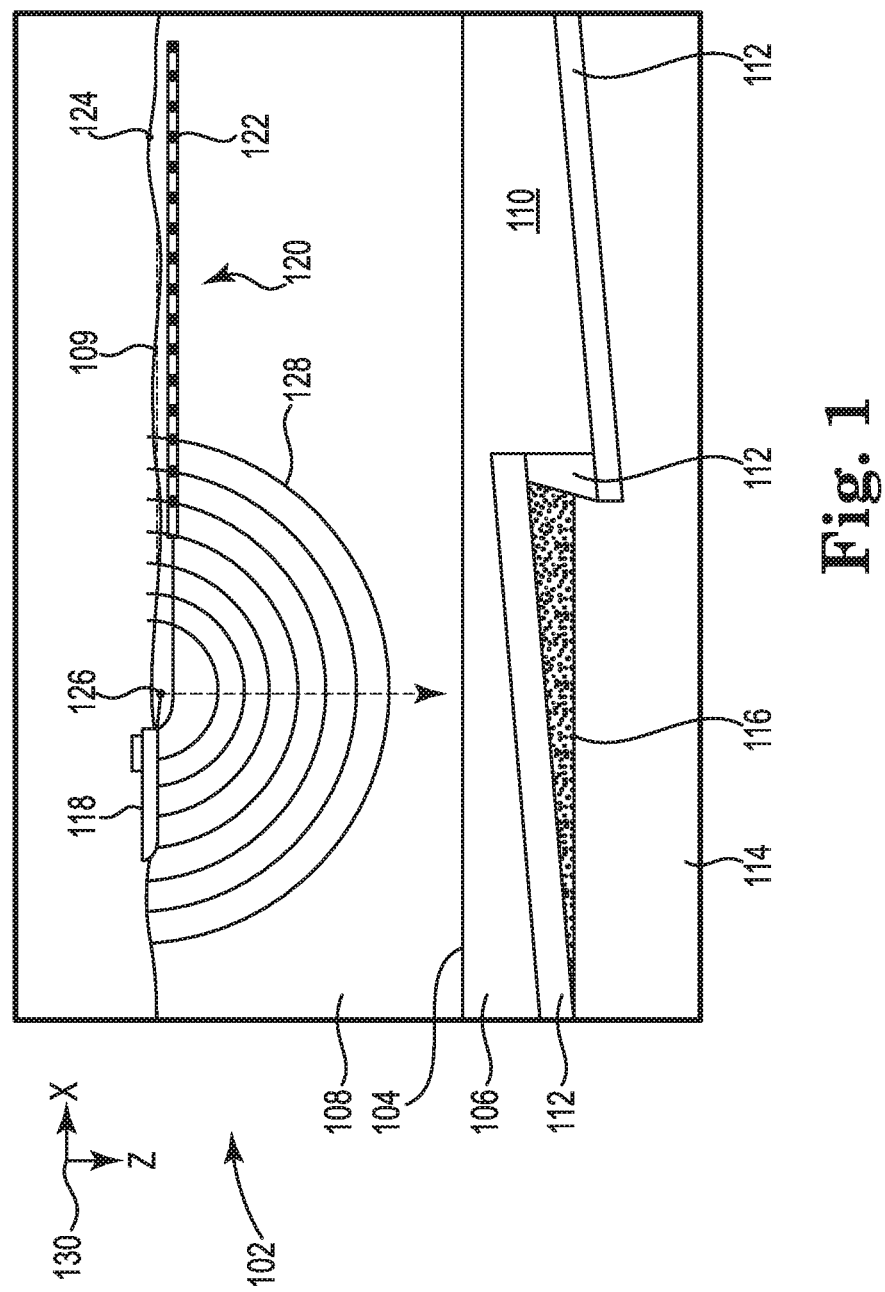
FIG. 1 illustrates an elevation or xz-plane view of marine surveying in which acoustic signals are emitted by a source for recording by receivers

This disclosure is related generally to the field of marine surveying. Marine surveying can include, for example, seismic and/or electromagnetic surveying, among others. For example, this disclosure may have applications in marine surveying, in which one or more source elements are used to generate wave-fields, and sensors (towed and/or ocean bottom) receive energy generated by the source elements and affected by the interaction with a subsurface formation. The sensors thereby collect survey data, which can be useful in the discovery and/or extraction of hydrocarbons from subsurface formations.

In some previous approaches, multi-component receivers comprising both a motion sensor, such as a geophone, and a hydrophone may be used to measure different aspects of a reflected wavefield following the actuation of a source. As used herein, "hydrophone" refers to a unit including a first detector and a second detector, which can be piezoelectric elements, that can be used to measure pressure. The motion sensor may detect particle displacement within the water by detecting particle motion variation, such as velocities or accelerations whereas the hydrophone may detect pressure variation. Multi-component receivers may be complex and costly and, when a streamer makes use of multi-component receivers, the complexity and cost of the streamer may be increased as well. However, hydrophones, such as bender-type hydrophones, can include a pair of detectors that are sensitive to pressure as well as particle motion.

In an effort to overcome the above described shortcomings of multi-component receivers, at least one embodiment in accordance with the present disclosure can include isolating a first portion of electric potentials generated by a first detector and a second detector of a hydrophone that is indicative of particle motion and isolating a second portion of the electric potentials generated by the first detector and the second detector of the hydrophone that is indicative of pressure. Instead of using a motion sensor to measure particle motion, a single hydrophone can be used to measure both pressure and particle motion. Individual leads can be coupled to each detector of a hydrophone. A difference of the electric potentials generated by the detectors of the hydrophone can be indicative of particle motion measured by the detector of the hydrophone. A sum of the electric potentials generated by the detectors of the hydrophone can be indicative of pressure measured by the detectors of the hydrophone.

The electric potential generated by a first detector of a hydrophone can be measured separately from the electric potential generated by a second detector of the hydrophone. Isolating a first portion of electric potentials generated by a first detector and a second detector of a hydrophone that is indicative of particle motion can prevent a pressure measurement interfering with the particle motion measurement in the form of noise in the particle measurement. Isolating a second portion of the electric potentials generated by the first detector and the second detector of the hydrophone that is indicative of pressure can prevent a particle motion measurement interfering with a pressure measurement in the form of noise in the pressure measurement.

At least one embodiment in accordance with the present disclosure can replace previous multi-component receivers with receivers comprising only hydrophones, thereby simplifying and reducing the cost of the receivers and streamers that make use of the receivers. Noise performance of streamers that make use of receivers comprising only hydrophones can be improved as compared to the noise performance of streamers that make use of multi-component receivers. As used herein, "noise performance" refers to how much noise from various noise sources can be reduced relative to other approaches. Noise sources can include, but is not limited to, waves in a fluid volume, movement of the streamers, and components of or coupled to the streamers. Reducing the quantity of components of the receivers can reduce the likelihood of noise and thereby increase the noise performance.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 223 may reference element "23" in FIGS. 2A and 2B, and a similar element may be referenced as 523 in FIG. 5. Multiple analogous elements within one figure may be referenced with a reference numeral followed by a hyphen and another numeral or a letter. For example, 523-1 may reference element 23-1 in FIGS. 5 and 523-2 may reference element 23-2, which can be analogous to element 23-1. Such analogous elements may be generally referenced without the hyphen and extra numeral or letter. For example, elements 523-1 and 523-2 may be generally referenced as 523. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which acoustic signals are emitted by a source 126 for recording by receivers 122 for processing and analysis in order to help characterize the structures and distributions of features and materials underlying the solid surface of the earth. FIG. 1 shows a domain volume 102 of the earth's surface comprising a solid volume 106 of sediment and rock below the solid surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for a class of marine surveys, such as marine seismic surveys. FIG. 1 illustrates a first sediment layer 110, an uplifted rock layer 112, underlying rock layer 114, and hydrocarbon-saturated layer 116. One or more elements of the solid volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the water surface 109. The streamers 120 can be long cables containing power and data-transmission lines (electrical, optical fiber, etc.) to which receivers may be connected. In at least one embodiment, each receiver, such as the receiver 122 represented by the shaded disk in FIG. 1, can comprise a sensor, such as a hydrophone, that detects variations in particle motion, such as velocities or accelerations, and variations in pressure. A first portion of electric potentials generated by the hydrophone of the receiver 122 can be isolated that is indicative of particle motion and a second portion of electric potentials generated by the hydrophone of the receiver 122 can be isolated that is indicative of pressure. Thus, one or more receivers can comprise only a hydrophone to measure both particle motion and pressure. A motion sensor, such as a geophone, that detects particle displacement within the water by detecting particle motion variation, such as velocities or accelerations may not need to be included as a component of the one or more receivers.

The streamers 120 and the marine survey vessel 118 can include sophisticated sensing electronics and data-processing facilities that allow receiver readings to be correlated with absolute positions on the water surface and absolute three-dimensional positions with respect to a three-dimensional coordinate system. In FIG. 1, the receivers along the streamers are shown to lie below the water surface 109, with the receiver positions correlated with overlying surface positions, such as a surface position 124 correlated with the position of receiver 122. The marine survey vessel 118 can also tow one or more sources 126 that produce acoustic signals as the marine survey vessel 118 and streamers 120 move across the water surface 109. Sources 126 and/or streamers 120 may also be towed by other vessels, or may be otherwise disposed in fluid volume 108. For example, receivers may be located on ocean bottom cables or nodes fixed at or near the solid surface 104, and sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to seismic receivers located on a towed streamer, an ocean bottom receiver cable, and/or an array of nodes.

FIG. 1 shows an expanding, spherical acoustic signal, illustrated as semicircles of increasing radius centered at the source 126, representing a down-going wavefield 128, following an acoustic signal emitted by the source 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the streamers 120, and may partially refract downward into the solid volume 106, becoming elastic acoustic signals within the solid volume 106.

Figure 2A:
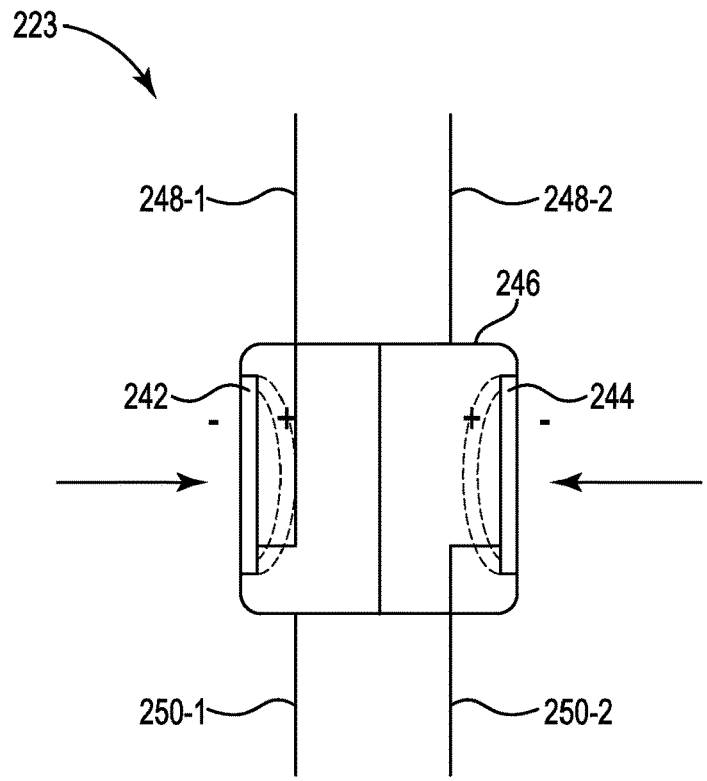
FIG. 2A illustrates a schematic diagram of a hydrophone subjected to pressure.
Figure 2B:
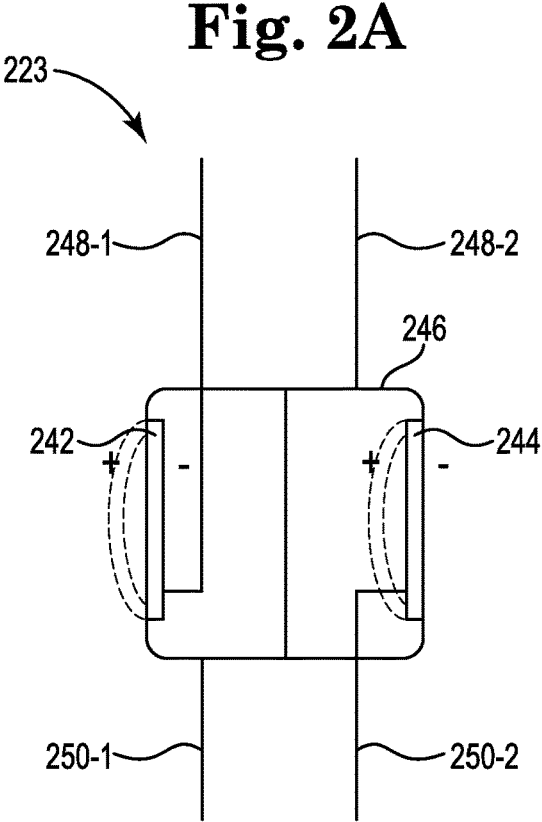
FIG. 2B illustrates a schematic diagram of a hydrophone subjected to particle motion.

FIG. 2A illustrates a schematic diagram of a hydrophone 223 subjected to pressure. The external pressure is greater than an internal pressure of the hydrophone 223. The hydrophone 223 can be analogous to or a component of the receiver 122 illustrated in FIG. 1. The hydrophone 223 can include detectors that deflect in response to pressure and particle motion, such as in a bender-type hydrophone. FIG. 2A shows the hydrophone 223 including a first detector 242 and a second detector 244 located within a housing 246. The housing 246 can comprise a metal such as brass. The first detector 242 and the second detector 244 can each comprise a piezoelectric material such as a piezoceramic. The lead 248-1 can be coupled to the first detector 242. Leads 250-1 and 248-2 can be coupled to the housing 246. The lead 250-2 can be coupled to the second detector 244. The electrical connections of the first detector 242 are independent of the electrical connections of the second detector 244 because no lead is coupled to both the first detector 242 and the second detector 244 of a hydrophone 223. The sensitivity of the first detector 242 and the sensitivity of the second detector 244 can be matched. In the example of FIGS. 2A and 2B the sensitivity of the first detector 242 matches the sensitivity of the second detector 244. As used herein, "sensitivity" refers to the ratio between the output signal of a sensor, or a component thereof, such as a detector, and the property measured by the sensor, or the component thereof. As used herein, "matching sensitivities" refers to selecting a respective first detector and a respective second detector of a hydrophone such that the sensitivity of the respective first detector is equal to the sensitivity of the respective second detector. For example, the sensitivity of the first detector 242 to acceleration and the sensitivity of the second detector 244 to acceleration can be matched. With respect to the sensitivity of the detectors, "equal to" means that the sensitivities are equal within an order of magnitude less than an order of magnitude of the difference between sensitivities of different detectors in a group of detectors. For example, consider a group of four hypothetical detectors having sensitivities (in generic units) of 1.001 (first detector), 1.002 (second detector), 1.011 (third detector), and 1.012 (fourth detector). The first and second detectors (and the third and fourth detectors) can be said to have equal sensitivities because the difference in sensitivities therebetween is on the order of thousandths of the generic unit (1.002−1.001=0.001; and 1.012−1.011=0.001), whereas the difference between the different detectors in the group is on the order of hundredths of the generic unit (1.012−1.001=0.011).

A detector comprising a piezoelectric material can generate an electric potential in response to a surface thereof being subjected to an external force. An example of the external force is pressure, which is force over area. Another example of the external force can result from particle motion, such as a unilateral force resulting from acceleration. The sensitivity of a detector, such as the sensitivity of a detector to acceleration, can be a function of the capacitance of the detector. Thus, matching the sensitivity of the first detector 242 with the sensitivity of the second detector 244 can include selecting the first detector 242 and the second detector 244 such that a capacitance of the first detector 242 is equal to a capacitance of the second detector 244. With respect to the capacitances of detectors, "equal to" means that the capacitances are equal within an order of magnitude less than an order of magnitude of the difference between capacitances of different detectors in a group of detectors. The capacitance of a detector can be dependent on the physical dimensions, such as the size and weight, of the detector. Thus, matching the capacitance of the first detector 242 with the capacitance of the second detector 244 can include selecting the first detector 242 and the second detector 244 such that they have similar sizes, weights, or sizes and weights.

FIG. 2A illustrates the effect of a compressive pressure, herein after referred to as pressure, on the first detector 242 and the second detector 244. The pressure may also be referred to as an increase in pressure versus a previous state. The pressure is illustrated by the arrows pointing toward the first detector 242 and the second detector 244. The pressure is greater than an internal pressure of the hydrophone 223. The first detector 242 and the second detector 244 can deflect relative to the housing 246. The pressure causes the first detector 242 and the second detector 244 to deflect inwards to the housing 246 as indicated by the dashed outlines of the first detector 242 and the second detector 244. The first detector 242 and the second detector 244 deflect in opposite directions. The dashed outlines are not drawn to scale and do not illustrate the actual amount of deflection. The first detector 242 and the second detector 244 can be configured to generate a polarized electric potential on a side of the detector 242, 244 toward which the deflection occurs and generate an oppositely-polarized electric potential on a side of the detector 242, 244 away from which the deflection occurs. In the example of FIGS. 2A and 2B, the respective sides of the first detector 242 and the second detector 244 toward which the deflection occurs generate a positive electric potential is indicated by the plus sign (+), and the respective sides of the first detector 242 and the second detector 244 away from which the deflection occurs generate a negative electric potential as indicated by the minus sign (−). However, embodiments are not so limited, as the first detector 242 and the second detector 244 can be configured such that the polarity of the electric potentials generated in response to the deflection could be reversed. In the example of FIG. 2A, the electric potential across the leads 248-1 and 250-1 and the electric potential across the leads 248-2 and 250-2 are positive because the leads 248-1 and 248-2 are connected to the sides of the first detector 242 and the second detector 244 toward which the deflection occurs.

FIG. 2B illustrates a schematic diagram of a hydrophone 223 subjected to particle motion. The hydrophone 223 illustrated in FIG. 2B is the same hydrophone 223 illustrated in FIG. 2A. FIG. 2B shows the effect of particle motion in the form of acceleration on the first detector 242 and the second detector 244. The first detector 242 and the second detector 244 can deflect relative to the housing 246. When the hydrophone 223 is subjected to acceleration the first detector 242 and the second detector 244 deflect in the direction of a corresponding unilateral force. As indicated by the dashed outlines, the first detector 242 and the second detector 244 deflect in the same direction. The dashed outlines are not drawn to scale and do not illustrate the actual amount of deflection. In the example of FIG. 2B, the electric potential across the leads 248-1 and 250-1 is negative because the lead 248-1 is connected to the side of the first detector 242 away from which the deflection occurs. The electric potential across the leads 248-2 and 250-2 is positive because the lead 248-2 is connected to the side of the second detector 244 toward which the deflection occurs.

FIG. 2A shows the hydrophone 223 being subjected to pressure only and FIG. 2B shows the hydrophone 223 being subjected to particle motion only. However, the hydrophone 223 can be simultaneously subjected to pressure and particle motion. For example, if the hydrophone 223 is a component of a receiver of a streamer, the hydrophone 223 can be subjected to pressure from a reflected wavefield as well as vibration in the streamer. Vibration in the streamer can be caused by the reflected wavefield or waves in the water, which in turn can subject the hydrophone 223 to particle motion.

Because the electric potentials generated by the hydrophone 223 can be in response to both pressure and particle motion, it can be beneficial to isolate the portion of the electric potentials that is indicative of pressure and to isolate the portion of the electric potentials that is indicative of particle motion. At least one embodiment includes isolating a first portion of electric potentials generated by the first detector 242 and the second detector 244 of the hydrophone 223 that is indicative of particle motion and isolating a second portion of the electric potentials generated by the first detector 242 and the second detector 244 of the hydrophone 223 that is indicative of pressure. The first portion and the second portion of the electric potentials generated by the hydrophone 223 can be isolated interchangeably.

To isolate the first portion of the electric potentials generated by the first detector 242 and the second detector 244 of the hydrophone 223 that is indicative of particle motion, a first electric potential generated by the first detector 242 can be subtracted from a second electric potential generated by the second detector 244. The second electric potential can be measured separately from the first electric potential. The first electric potential can be measured across the leads 248-1 and 250-1 and the second electric potential can be measured across the leads 248-2 and 250-2. Thus, the difference between the electric potential across the leads 248-2 and 250-2 and the electric potential across the leads 248-1 and 250-1 can be indicative of particle motion measured by the first detector 242 and the second detector 244.

Because the sensitivity of the first detector 242 matches the sensitivity of the second detector 244, the first detector 242 can generate an electric potential of a magnitude that is approximately equal to the magnitude of the electric potential generated by the second detector 244 when the first detector 242 and the second detector 244 deflect by the same, or nearly the same, amount. The first detector 242 and the second detector 244 can deflect in response to pressure as in the example of FIG. 2A or particle motion as in the example of FIG. 2B. For example, the first detector 242 and the second detector 244 can each generate an electric potential of X volts in response to pressure. This is because, as illustrated in FIG. 2A, the first detector 242 and the second detector 244 deflect the same amount in opposite directions in response to pressure. Subtracting the electric potential generated by the first detector 242 from the electric potential generated by the second detector 244, or vice versa, would result in a zero, or near zero, electric potential. Therefore, the effect of pressure on the hydrophone 223 can be cancelled out. The first portion can be the result of the subtraction, which isolates the first portion of the electrical potentials generated by the first detector 242 and the second detector 244. The first portion can be indicative of particle motion measured by the first detector 242 and the second detector 244.

To isolate the second portion of the electric potentials generated by the first detector 242 and the second detector 244 of the hydrophone 223 that is indicative of pressure, a first electric potential generated by the first detector 242 can be summed with a second electric potential generated by the second detector 244. The second electric potential can be measured separately from the first electric potential. The first electric potential can be measured across the leads 248-1 and 250-1 and the second electric potential can be measured across the leads 248-2 and 250-2. Thus, the sum of the electric potential across the leads 248-1 and 250-1 and the electric potential across the leads 248-2 and 250-2 can be indicative of pressure measured by the first detector 242 and the second detector 244.

Because the sensitivity of the first detector 242 matches the sensitivity of the second detector 244, the first detector 242 can generate an electric potential of a magnitude that is approximately equal to the magnitude of the electric potential generated by the second detector 244 when the first detector 242 and the second detector 244 deflect by the same, or nearly the same, amount. The first detector 242 and the second detector 244 can deflect in response to pressure as in the example of FIG. 2A or particle motion as in the example of FIG. 2B. For example, the first detector 242 can generate an electric potential of −X volts in response to particle motion and the second detector 242 can generate an electric potential of X volts in response to particle motion. This is because, as illustrated in FIG. 2B, the first detector 242 and the second detector 244 deflect the same amount in the same direction in response to particle motion. Summing the electric potential generated by the first detector 242 with the electric potential generated by the second detector 244, or vice versa, would result in a zero, or near zero, electric potential. Therefore, the effect of particle motion on the hydrophone 223 can be cancelled out. The second portion can be the result of the addition, which isolates the second portion of the electrical potentials generated by the first detector 242 and the second detector 244. The second portion can be indicative of pressure measured by the first detector 242 and the second detector 244.

Figure 3:
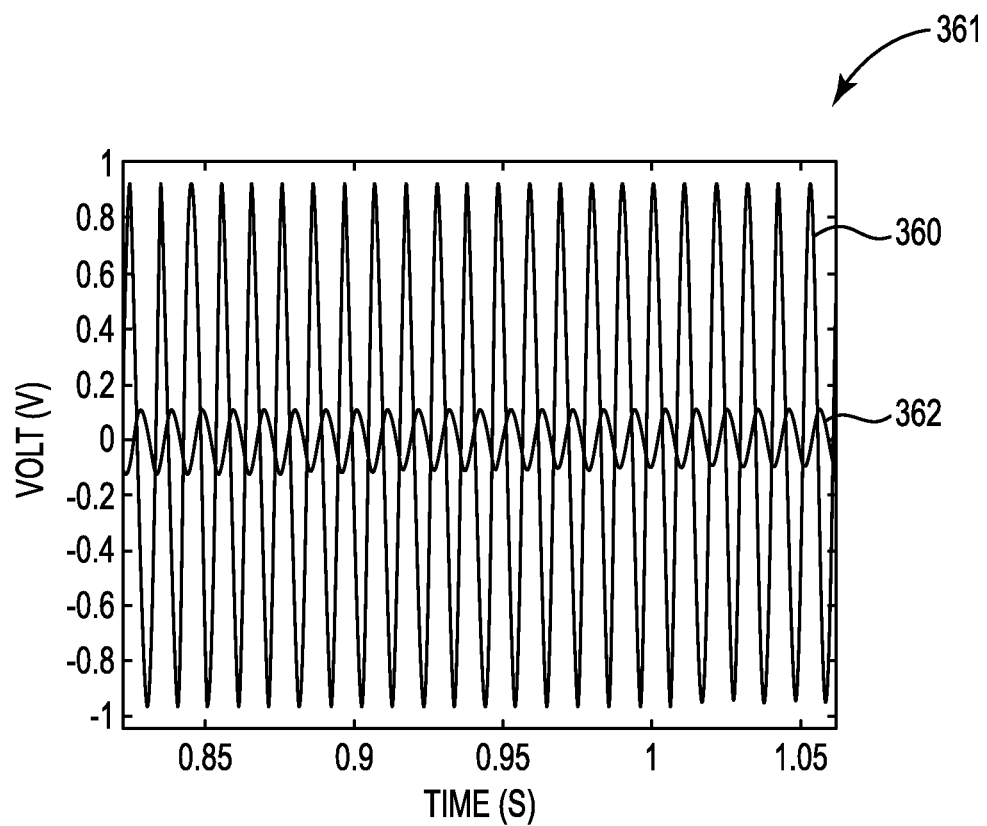
FIG. 3 illustrates a time signal graph of lab test data of a geophone and lab test data of a hydrophone demonstrating the sensitivity of the hydrophone to acceleration.

FIG. 3 illustrates a time signal graph 361 of lab test data 360 of a geophone and lab test data 362 of a hydrophone demonstrating the sensitivity of the hydrophone to acceleration. The lab test data 362 corresponds to the output signal of the hydrophone. The vertical axis indicates magnitude in volts (V) and the horizontal axis indicates the time into the lab test in seconds(s). The lab test data 360 and 362 were generated by the geophone and the hydrophone while on a shaker table. The geophone and the hydrophone were subjected to accelerations applied in opposite directions over time. In this example, the lab test data 360 of the geophone illustrates the velocity of the geophone and the lab test data 362 illustrates the acceleration of the hydrophone during the lab test. The lab test data 360 of the geophone illustrates the alternating velocity caused by the shaker table shaking in alternating directions over time. The lab test data 362 of the hydrophone illustrates the alternating acceleration caused by the shaker table shaking in alternating directions over time. As discussed above, acceleration can correspond to particle motion. The hydrophone that generated the lab test data 362 is analogous to the hydrophone 223 illustrated in FIGS. 2A and 2B. The time signal graph 361 shows magnitude of the lab test data 362 of the hydrophone varying over time in response to acceleration. The lab test data 362 of the hydrophone includes alternating increases and decreases in magnitude that have peaks and valleys that generally line up with the changes in parts of the graph indicating changes in the velocity from the lab test data 360 from the geophone corresponding to accelerations. Thus, the lab test data 362 of the hydrophone has its largest magnitude when the acceleration applied by the shaker table has the largest magnitude. This indicates that the hydrophone is sensitive to and can measure particle motion even though the hydrophone is intended to measure pressure.

A hydrophone, such as the hydrophone 223 illustrated in FIGS. 2A and 2B, can be inherently sensitive to particle motion; however, the hydrophone can be configured such that the hydrophone has increased sensitivity to particle motion relative to an inherent sensitivity to particle motion. For example, the mass of the housing of the hydrophone, such as the housing 246 of the hydrophone 223 illustrated in FIGS. 2A and 2B, can be increased. As an example, the hydrophone can be analogized to a mass-spring system. Increasing the mass of the housing can be analogized to increasing the mass of the mass-spring system, which can cause greater deflection of the spring corresponding to an increased sensitivity to particle motion. Increasing the mass of the housing may not increase the strength of the housing. In addition, or in the alternative to increasing the mass of the housing, the thickness of the housing can be decreased. Decreasing the thickness of the housing can be analogized to decreasing the spring constant, or the stiffness, of the spring of the mass-spring system, which in turn can cause greater deflection of the spring corresponding to an increased sensitivity to particle motion. Increasing the sensitivity of the hydrophone to particle motion may not negatively affect the hydrophone's sensitivity to pressure. In fact, a hydrophone configured for increased sensitivity to particle motion can have an increased sensitivity to pressure as well because of the increased deflection of the first and second detectors.

Figure 4:
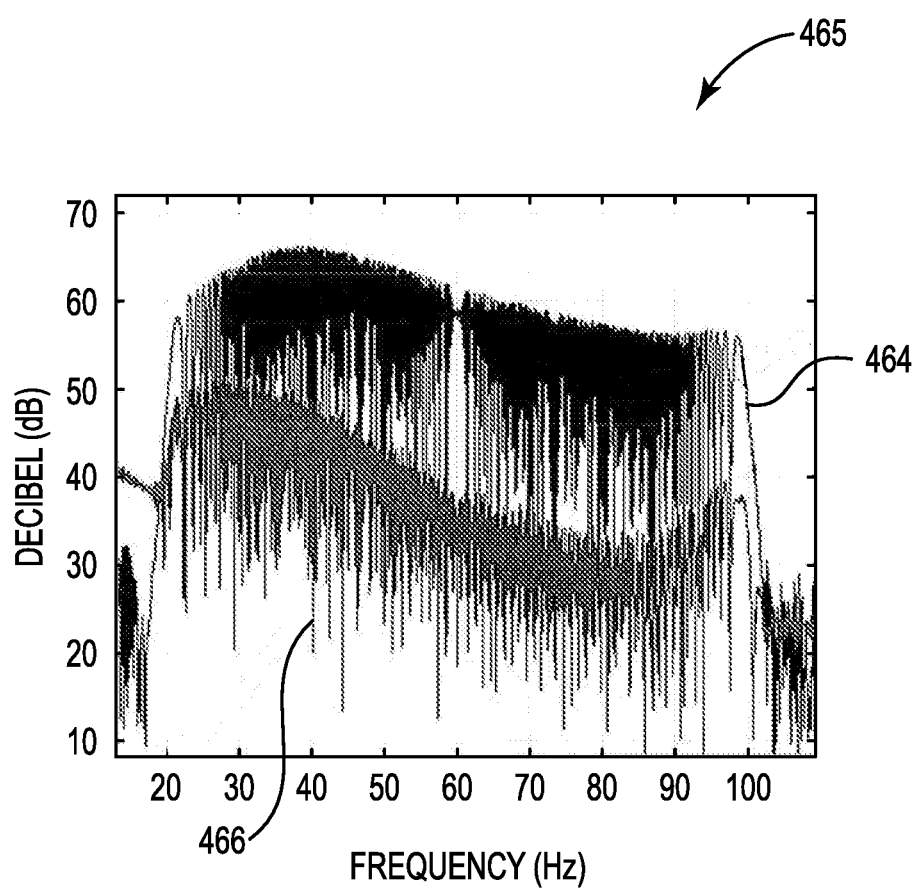
FIG. 4 illustrates a frequency spectrum graph of lab test data of a geophone and lab test data of a hydrophone demonstrating the sensitivity of the hydrophone to acceleration.

FIG. 4 illustrates a frequency spectrum graph 465 of lab test data 464 of a geophone and lab test data 466 of a hydrophone demonstrating the sensitivity of the hydrophone to acceleration. In this example, the lab test data 464 illustrates the sensitivity of the geophone to velocity and the lab test data 466 illustrates the sensitivity of the hydrophone to acceleration. The lab test data 464 and 466 were generated by the geophone and the hydrophone while on a shaker table. The geophone and the hydrophone were subjected to accelerations applied in opposite directions over time. As discussed above, acceleration can correspond to particle motion. The vertical axis of the frequency spectrum graph 465 indicates the magnitude of the lab test data 464 and 466 in decibels (dB) and the horizontal axis indicates the frequency of the shaker table in hertz (Hz). Decibels are used to compare the relative sensitivity of the hydrophone to acceleration to the relative sensitivity of the geophone to acceleration. The hydrophone that generated the lab test data 466 is analogous to the hydrophone 223 illustrated in FIGS. 2A and 2B. Note that there is a 90-degree phase shift between the lab test data 464 and the lab test data 466 because the lab test data 464 of the geophone corresponds to velocity whereas the lab survey data 466 of the hydrophone corresponds to acceleration. Although the lab test data 466 has lesser magnitudes than that of the lab test data 464, the lab test data 466 includes increases and decreases in magnitude that follows generally the similar shape of the lab test data 464. For example, the magnitude of the lab test data 464 decreases from approximately 65 dB at approximately 35 Hz to approximately 55 dB at approximately 85 Hz and the lab test data 466 decreases from approximately 50 dB at approximately 35 Hz to approximately 35 dB at approximately 85 Hz. This indicates that the hydrophone is sensitive to and can measure particle motion even though the hydrophone is intended to measure pressure.

Figure 5:
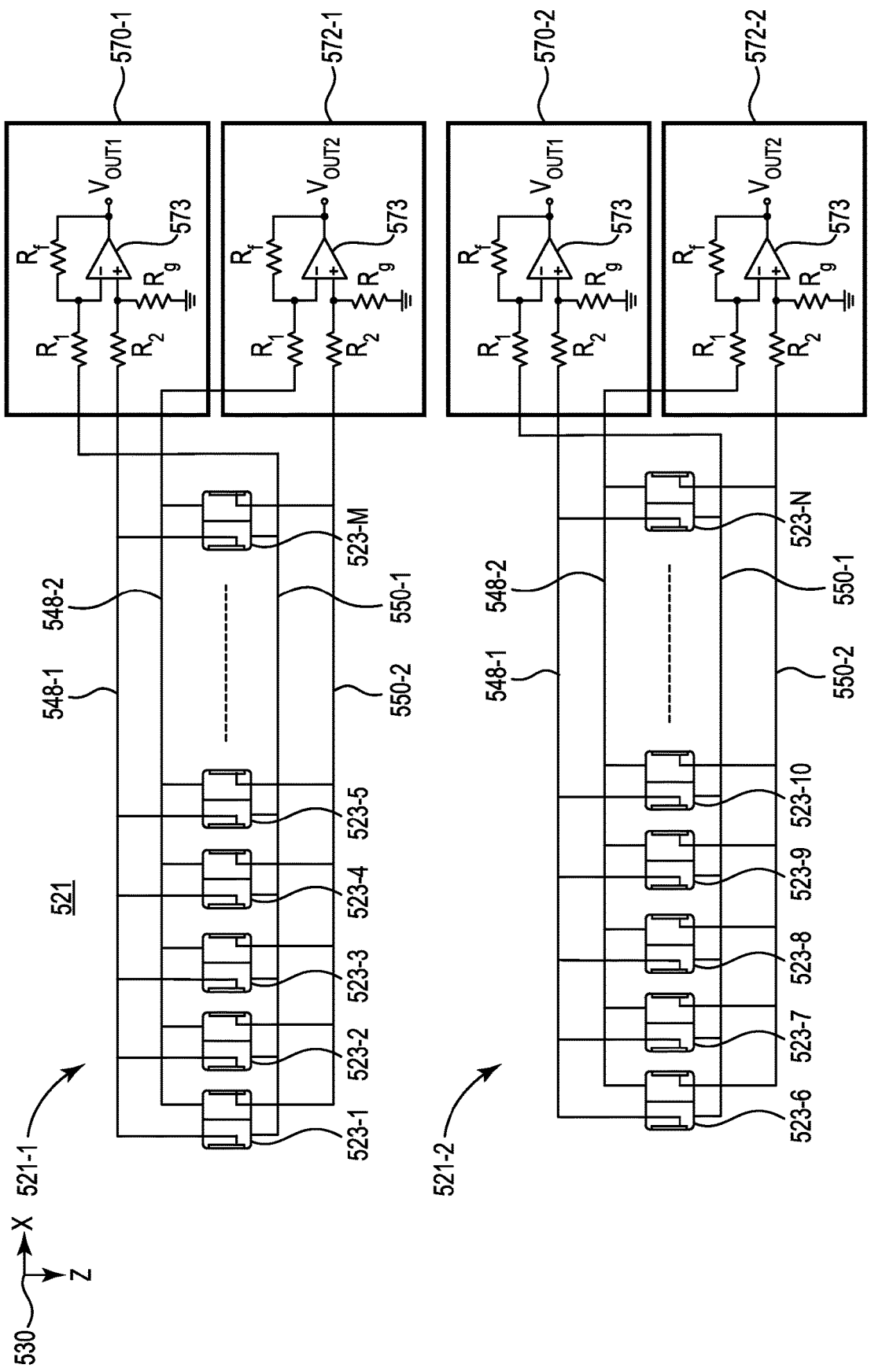
FIG. 5 illustrates a schematic diagram of an array of hydrophones for measuring particle motion and pressure.

FIG. 5 illustrates a schematic diagram of an array 521 of hydrophones 523 for measuring particle motion and pressure. The array 521 can comprise a first sub-array 521-1 and a second sub-array 521-2. Although FIG. 5 illustrates the first sub-array 521-1 comprising the hydrophones 523-1, 523-2, 523-3, 523-4, 523-5, . . . , 523-M and the second sub-array 521-2 comprising the hydrophones 523-6, 523-7, 523-8, 523-9, 523-10, . . . , 523-N, the first sub-array 521-1 and the second sub-array 521-2 can comprise any quantity of the hydrophones 523. The hydrophones 523-1 through 523-M and 523-6 through 523-N are referred to collectively as the hydrophones 523 and can be analogous to the hydrophone 223 illustrated in FIGS. 2A and 2B. The first sub-array 521-1 can comprise a different quantity of the hydrophones than the second sub-array 521-2. As will be appreciated by one of ordinary skill in the art, noise performance, such as that shown on a relative coherence measure (RCM) plot, can be improved when the first sub-array 521-1 or the second sub-array 521-2 comprises a large quantity of the hydrophones 523 such that the noise performance is proportional to the square root of the quantity of the hydrophones 523.

As shown in FIG. 5, the first sub-array 521-1 and the second sub-array 521-2 can each have the leads 548-1, 548-2, 550-1, and 550-2. The lead 548-1 is coupled to the first detector, such as the first detector 242 illustrated in FIGS. 2A and 2B, of each hydrophone of the first sub-array 521-1 or the second sub-array 521-2. The lead 548-1 can correspond to the direct coupling of the leads coupled to the first detector, such as the lead 248-1 illustrated in FIGS. 2A and 2B, of each hydrophone of the first sub-array 521-1 or the second sub-array 521-2. The lead 550-2 is coupled to the second detector, such as the second detector 244 illustrated in FIGS. 2A and 2B, of each hydrophone of the first sub-array 521-1 or the second sub-array 521-2. The lead 550-2 can correspond to the direct coupling of the leads coupled to the first detector, such as the lead 250-2 illustrated in FIGS. 2A and 2B, of each hydrophone of the first sub-array 521-1 or the second sub-array 521-2. The leads 548-2 and 550-1 are coupled to the housing, such as the housing 246 illustrated in FIGS. 2A and 2B, of each hydrophone of the first sub-array 521-1 or the second sub-array 521-2. The leads 548-2 and 550-1 can correspond to the direct coupling of the leads coupled to the housing, such as the leads 248-2 and 250-1 illustrated in FIGS. 2A and 2B, of each hydrophone of the first sub-array 521-1 or the second sub-array 521-2. The first detectors of the hydrophones of the array 521 can be coupled together and the second detectors of the hydrophones of the array 521 can be coupled together. But the first detectors are not directly coupled to the second detectors. Thus, the electric potentials generated by the first detectors can be measured separately from the electric potentials generated by the second detectors.

In the example of FIG. 5, the sensitivity of the respective first detector of each hydrophone matches the sensitivity of the respective second detector of each hydrophone of the array 521. Thus, the respective first detector of each hydrophone can generate an electric potential of a magnitude that is approximately equal to the magnitude of the electric potential generated by the respective second detector of each hydrophone when the respective first detector and the respective second detector deflect by the same, or nearly the same, amount. The respective first detector and the respective second detector of each hydrophone can deflect in response to pressure as in the example of FIG. 2A or particle motion as in the example of FIG. 2B. For example, the first detectors of the array 521 and the second detectors of the array 521 can each as a group generate a combined electric potential of X volts in response to pressure. Subtracting the combined electric potential generated by the first detectors from the combined electric potential generated by the second detectors, or vice versa, would result in a zero, or near zero, electric potential. Therefore, the effect of pressure on the hydrophones 523 of the array 521 can be cancelled out. A first portion of the combined electrical potentials generated by the first detectors and the second detectors can be the result of the subtraction. The subtraction of the combined electric potentials isolates the first portion. The first portion can be indicative of particle motion measured by the first detectors and the second detectors.

The combined electric potential generated by the first detectors can be a sum of the electrical potentials generated by each of the first detectors or an average of the electrical potentials generated by each of the first detectors. The combined electric potential generated by the second detectors can be a sum of the electrical potentials generated by each of the second detectors or an average of the electrical potentials generated by each of the second detectors.

To isolate the first portion of the electric potentials generated by the first detectors and the second detectors of the hydrophones of the array 521 that is indicative of particle motion, a combined electric potential generated by the first detectors can be subtracted from a combined electric potential generated by the second detectors. The combined electric potential generated by the first detectors can be measured across the leads 548-1 and 550-1 and the combined electric potential generated by the second detectors can be measured across the leads 548-2 and 550-2. Thus, the difference between the electric potential across the leads 548-2 and 550-2 and the electric potential across the leads 548-1 and 550-1 can be indicative of particle motion measured by the first detectors and the second detectors of the array 521.

The first portion of the electric potentials generated by the first detectors and the second detectors of the hydrophones of just the first sub-array 521-1 can be isolated. The first portion of the electric potentials generated by the first detectors and the second detectors of the hydrophones of just the second sub-array 521-2 can be isolated. The first portion of the electric potentials generated by the first detectors and the second detectors of the hydrophones of both the first sub-array 521-1 and the second sub-array 521-2 can be isolated.

In the example of FIG. 5, the sensitivity of the respective first detector of each hydrophone matches the sensitivity of the respective second detector of each hydrophone of the array 521. Thus, the respective first detector of each hydrophone can generate an electric potential of a magnitude that is approximately equal to the magnitude of the electric potential generated by the respective second detector of each hydrophone when the respective first detector and the respective second detector deflect by the same, or nearly the same, amount. The respective first detector and the respective second detector of each hydrophone can deflect in response to pressure as in the example of FIG. 2A or particle motion as in the example of FIG. 2B. For example, the first detectors of the array 521 can generate a combined electric potential of –X volts in response to particle motion and the second detectors of the array 521 can generate a combined electric potential of X volts in response to particle motion. Summing the combined electric potential generated by the first detectors with the combined electric potential generated by the second detectors would result in a zero, or near zero, electric potential. Therefore, the effect of particle motion on the hydrophones 523 of the array 521 can be cancelled out. The remaining portion, a second portion, of the combined electrical potentials generated by the first detectors and the second detectors can be isolated. The second portion can be indicative of pressure measured by the first detectors and the second detectors.

To isolate the second portion of the electric potentials generated by the first detectors and the second detectors of the hydrophones of the array of hydrophones 521 that is indicative of pressure, a combined electric potential generated by the first detectors can be summed with a combined electric potential generated by the second detectors. The combined electric potential generated by the first detectors can be measured across the leads 548-1 and 550-1 and the combined electric potential generated by the second detectors can be measured across the leads 548-2 and 550-2. Thus, the sum of the electric potential across the leads 548-1 and 550-1 and the electric potential across the leads 548-2 and 550-2 can be indicative of pressure measured by the first detectors and the second detectors of the hydrophones of the array of hydrophones 521.

The second portion of the electric potentials generated by the first detectors and the second detectors of the hydrophones of just the first sub-array 521-1 can be isolated. The second portion of the electric potentials generated by the first detectors and the second detectors of the hydrophones of just the second sub-array 521-2 can be isolated. The second portion of the electric potentials generated by the first detectors and the second detectors of the hydrophones of both the first sub-array 521-1 and the second sub-array 521-2 can be isolated.

At least one embodiment can include preamplifier circuitry coupled to the sub-arrays 521-1 and 521-2; however, embodiments are not so limited. The leads 550-1 and 548-1 of the first sub-array 521-1 can be coupled to a first preamplifier circuit 570-1 and the leads 548-2 and 550-2 of the first sub-array 521-1 can be coupled to a second preamplifier circuit 572-1. Similarly, the leads 550-1 and 548-1 of the second sub-array 521-2 can be coupled to a first preamplifier circuit 570-2 and the leads 548-2 and 550-2 of the second sub-array 521-2 can be coupled to a second preamplifier circuit 572-2. The combined electric potential generated by the first detectors of the first sub-array 521-1 can be input to the first preamplifier circuit 570-1 and the combined electric potential generated by the second detectors of the first sub-array 521-1 can be input to the second preamplifier circuit 572-1. Similarly, the combined electric potential generated by the first detectors of the second sub-array 521-2 can be input to the first preamplifier circuit 570-2 and the combined electric potential generated by the second detectors of the second sub-array 521-2 can be input to the second preamplifier circuit 572-2. The first preamplifier circuits 570-1 and 570-2 are referred to collectively as the first preamplifier circuits 570. The second preamplifier circuits 572-1 and 572-2 are referred to collectively as the second preamplifier circuits 572. As shown in FIG. 5, the first preamplifier circuits 570 can comprise a resistor $R_1$ and a resistor $R_2$ coupled to the leads 550-1 and 548-1, respectively. The first preamplifier circuits 570 can include a pull-down resistor $R_g$ coupled to ground between the resistor $R_2$ coupled to the lead 548-1 and an amplifier 573 with a feedback resistor $R_f$ coupled to the resistor $R_1$ coupled to the lead 550-1. The second preamplifier circuits 572 can comprise a resistor $R_1$ and a resistor $R_2$ coupled to the leads 548-2 and 550-2, respectively, a pull-down resistor $R_g$ coupled to the resistor $R_2$ coupled to the lead 550-2 and ground, and an amplifier 573 with a feedback resistor $R_f$ coupled to the resistor $R_1$ coupled to the lead 548-2. Embodiments are not limited to the particular preamplifier circuits illustrated in FIG. 5. Embodiments can include any preamplifier circuit known to one of ordinary skill in the art.

In at least one embodiment, to isolate the first portion of the electric potentials generated by the first detectors and the second detectors of the hydrophones of the array of hydrophones 521 that is indicative of particle motion, the output $V_{out2}$ of the second preamplifiers 572, can be subtracted from the output $V_{out1}$ of the first preamplifiers 570. The first portion of the electric potentials generated by the first detectors and the second detectors of the hydrophones of just the first sub-array 521-1 can be isolated by subtracting the output $V_{out2}$ of the second preamplifier 572-1 from the output $V_{out1}$ of the first preamplifier 570-1. The first portion of the electric potentials generated by the first detectors and the second detectors of the hydrophones of just the second sub-array 521-2 can be isolated by subtracting the output $V_{out2}$ of the second preamplifier 572-2 from the output $V_{out1}$ of the first preamplifier 570-2.

In at least one embodiment, to isolate the second portion of the electric potentials generated by the first detectors and the second detectors of the hydrophones of the array of hydrophones 521 that is indicative of particle motion, the output $V_{out1}$ of the first preamplifiers 570 can be summed with the output $V_{out2}$ of the second preamplifiers 572. The first portion of the electric potentials generated by the first detectors and the second detectors of the hydrophones of just the first sub-array 521-1 can be isolated by summing the output $V_{out1}$ of the first preamplifier 570-1 from the output $V_{out2}$ of the second preamplifier 572-1. The first portion of the electric potentials generated by the first detectors and the second detectors of the hydrophones of just the second sub-array 521-2 can be isolated by summing the output $V_{out1}$ of the first preamplifier 570-2 from the output $V_{out2}$ of the second preamplifier 572-2.

In at least one embodiment, the first sub-array 521-1 can be a component of a first streamer, such as the streamer 120 illustrated in FIG. 1, and the second sub-array 521-2 can be a component of a second streamer. In at least one embodiment, a first hydrophone of an array of hydrophones can be spaced apart from a second hydrophone of the array of hydrophones by a particular distance. For example, the hydrophone 523-1 and the hydrophone 523-2 can be separated by 0.2 to 0.3 meters, which can reduce noise. Hydrophones, such as the hydrophones 523 that are component of the receivers 122 on the streamers 120 illustrated in FIG. 1, can be subjected to slow moving waves that may go through the streamers at, for example, thirty to forty meters per second. Spacing hydrophones apart by a short distance can reduce noise caused by these slow moving waves because the distance between the hydrophones is much shorter than the slow moving waves. Thus, only a few of the hydrophones may be affected by a slow moving wave at one time.

In at least one embodiment, the first array 521-1 can comprise a first component of a streamer and the second array 521-2 can comprise a second component of the streamer. For example, the first component can comprise 6.25 meters of a streamer and the second component can comprise 3.125 meters of the streamer. The first array 521-1 and the second array 521-2 can comprise the same or different lengths of one or more streamers. In at least one embodiment, eight to thirty-two of the hydrophones 523 can be spaced apart evenly along 12.5 meters of a streamer.

FIG. 6A illustrates a schematic diagram of a first sub-array 621-1 of hydrophones 623 oriented in the xz-plane 630 for measuring particle motion and pressure. FIG. 6B illustrates a schematic diagram of a second sub-array 621-2 of hydrophones 623 oriented in the xy-plane 631 for measuring particle motion and pressure. The first sub-array 621-1 can be analogous to the first sub-array 521-1 and the second sub-array 621-2 can be analogous to the sub-array 521-2 illustrated in FIG. 5. The hydrophones 623-1 through 623-M can be analogous to the hydrophone 223 illustrated in FIGS. 2A and 2B.

As illustrated in FIGS. 6A and 6B, the first sub-array 621-1 can be oriented in a first orientation (in the xz-plane 630) and the second sub-array 621-2 can be oriented in a second orientation orthogonal to the first orientation (in the xy-plane 631). The hydrophones 623-1 through 623-M of the first sub-array 621-1 are oriented in the xz-plane 630 such that pressure and particle motion can be detected in the xz-plane 630. In contrast, the hydrophones 623-6 through 623-M of the second sub-array 621-2 are oriented in the xy-plane 631 such that pressure and particle motion can be detected in the xy-plane 631. Together the sub-arrays 621-1 and 621-2 can measure both the vertical component and the horizontal component of pressure and particle motion of a reflected wavefield.

Figure 7:
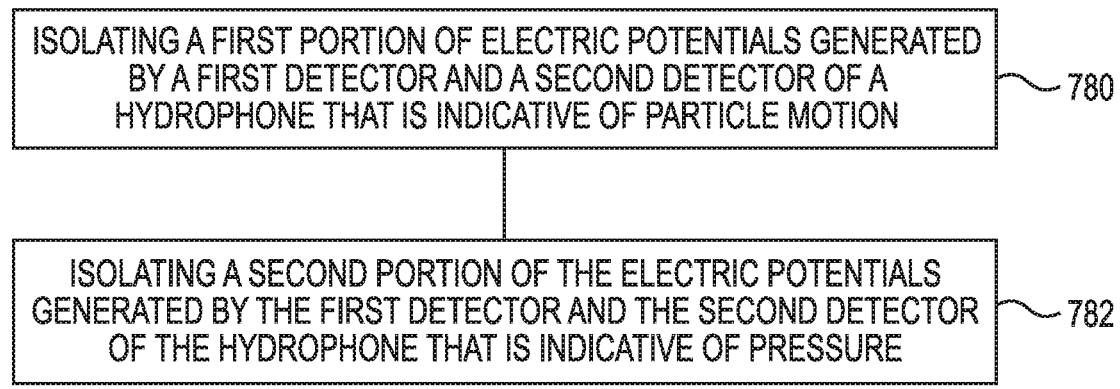
FIG. 7 illustrates a method for isolating a portion of electric potentials generated by a hydrophone that is indicative of particle motion or pressure.

FIG. 7 illustrates a method for measuring particle motion and pressure with a hydrophone. The method can include, at block 780, isolating a first portion of electric potentials generated by a first detector and a second detector of a hydrophone that is indicative of particle motion. Although not illustrated, the method can include measuring a first electric potential generated by the first detector and measuring a second electric potential generated by the second detector separately from the first electric potential. Isolating the first portion of the electric potentials generated by the first detector and the second detector of the hydrophone that is indicative of particle motion can include subtracting the second electric potential from the first electric potential.

The method can include, at block 782, isolating a second portion of the electric potentials generated by the first detector and the second detector of the hydrophone that is indicative of pressure. Isolating the second portion of the electric potentials generated by the first detector and the second detector of the hydrophone that is indicative of pressure can include summing the first electric potential with the second electric potential.

Although not illustrated in FIG. 7, the method can include isolating a first portion of electric potentials generated by first detectors and second detectors of an array of hydrophones that is indicative of particle motion and isolating a second portion of the electric potentials generated by the first detectors and the second detectors of the array of hydrophones that is indicative of pressure. The method can include measuring a first combined electric potential generated by the first detectors and measuring a second combined electric potential generated by the second detectors separately from the combined electric potential generated by the first detectors. Isolating the first portion of the combined electric potentials generated by the first detectors and the second detectors of the array of hydrophones that is indicative of particle motion can include subtracting the second combined electric potential from the first combined electric potential. Isolating the second portion of the electric potentials generated by the first detectors and the second detectors of the array of hydrophones that is indicative of particle motion can include summing the first combined electric potential with the second combined electric potential.

Although not illustrated in FIG. 7, isolating the first portion of the electric potentials generated by the first detectors and the second detectors of the array of hydrophones that is indicative of particle motion can include subtracting an output of a second preamplifier coupled to the second detectors from an output of a first preamplifier coupled to the first detectors. Isolating the second portion of the electric potentials generated by the first detectors and the second detectors of the array of hydrophones that is indicative of particle motion can include summing the output of the first preamplifier and the output of the second preamplifier.

Although not illustrated in FIG. 7, the method can include interchangeably isolating the first portion of electric potentials generated by the first detector and the second detector of the hydrophone that is indicative of particle motion and interchangeably isolating the second portion of the electric potentials generated by the first detector and the second detector of the hydrophone that is indicative of pressure.

In accordance with a number of embodiments of the present disclosure, a geophysical data product may be produced. The geophysical data product may include, for example, field data recorded during a survey utilizing the above-described techniques. Geophysical data may be obtained and stored on a non-transitory, tangible computer-readable medium. In some instances, geophysical analysis may be performed on the geophysical data product offshore according to techniques described herein or known in the art, and stored on a computer-readable medium, to produce an enhanced geophysical data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    measuring a first electric potential generated by a first detector of a hydrophone via a first pair of leads coupled to a housing of the hydrophone and the first detector, wherein the first detector has a first sensitivity;
    measuring a second electric potential generated by a second detector of the hydrophone separately from the first electric potential via a second pair of leads coupled to the housing and the second detector, wherein the second detector has a second sensitivity matching the first sensitivity;
    isolating a first portion of electric potentials generated by the first detector and the second detector of the hydrophone that is indicative of particle motion; and
    isolating a second portion of the electric potentials generated by the first detector and the second detector of the hydrophone that is indicative of pressure.

2. The method of claim 1,
    wherein isolating the first portion of the electric potentials generated by the first detector and the second detector of the hydrophone that is indicative of particle motion comprises subtracting the second electric potential from the first electric potential.

3. The method of claim 2, wherein isolating the second portion of the electric potentials generated by the first detector and the second detector of the hydrophone that is indicative of pressure comprises summing the first electric potential with the second electric potential.

4. The method of claim 2, further comprising:
    isolating a first portion of electric potentials generated by first detectors and second detectors of an array of hydrophones that is indicative of particle motion; and
    isolating a second portion of the electric potentials generated by the first detectors and the second detectors of the array of hydrophones that is indicative of pressure.

5. The method of claim 4, further comprising:
    measuring a first combined electric potential generated by the first detectors; and
    measuring a second combined electric potential generated by the second detectors separately from the combined electric potential generated by the first detectors,
    wherein isolating the first portion of the combined electric potentials generated by the first detectors and the second detectors of the array that is indicative of particle motion comprises subtracting the second combined electric potential from the first combined electric potential.

6. The method of claim 5, wherein isolating the second portion of the electric potentials generated by the first detectors and the second detectors of the array that is indicative of particle motion comprises summing the first combined electric potential with the second combined electric potential.

7. The method of claim 4, wherein isolating the first portion of the electric potentials generated by the first detectors and the second detectors of the array that is indicative of particle motion comprises subtracting an output of a second preamplifier coupled to the second detectors from an output of a first preamplifier coupled to the first detectors.

8. The method of claim 7, wherein isolating the second portion of the electric potentials generated by the first detectors and the second detectors of the array that is indicative of particle motion comprises summing the output of the first preamplifier and the output of the second preamplifier.

9. The method of claim 1, further comprising:
    interchangeably isolating the first portion of electric potentials generated by the first detector and the second detector of the hydrophone that is indicative of particle motion; and
    interchangeably isolating the second portion of the electric potentials generated by the first detector and the second detector of the hydrophone that is indicative of pressure.

10. An apparatus, comprising:
    a housing of a hydrophone;
    a first detector of the hydrophone having a first sensitivity;
    a second detector of the hydrophone having a second sensitivity matching the first sensitivity;
    a first pair of leads coupled to the housing and the first detector such that a first electric potential can be measured; and
    a second pair of leads coupled to the housing and the second detector such that a second electric potential can be measured, wherein the second pair of leads are independent from the first pair of leads, wherein a difference of the first electric potential and the second electric potential is indicative of particle motion measured by the first detector and the second detector, and wherein a sum of the first electric potential and the second electric potential indicative of pressure measured by the first detector and the second detector.

11. The apparatus of claim 10, wherein the first detector and the second detector measure pressure in response to the first detector deflecting in a first direction and the second detector deflecting in a second direction, wherein the first direction is opposite to the second direction; and wherein the first detector and the second detector measure particle motion in response to the first detector and the second detector deflecting in a same direction.

12. The apparatus of claim 10, wherein the first detector and the second detector each comprises a piezoelectric material.

13. The apparatus of claim 10, wherein particle motion and pressure are measured simultaneously by the first detector and the second detector.

14. A system, comprising:
an array of hydrophones;
a first pair of leads coupled to a respective first detector and a housing of each hydrophone of the array;
a second pair of leads coupled to a respective second detector and the housing of each hydrophone of the array independent of the first pair of leads;
a first preamplifier coupled to the first pairs of leads; and
a second preamplifier coupled to the second pairs of leads,
wherein a difference of an output of the first preamplifier and an output of the second preamplifier is indicative of particle motion measured by the first detectors and the second detectors of the array, and
wherein a sum of the output of the first preamplifier and the output of the second preamplifier is indicative of pressure measured by the first detectors and the second detectors of the array.

15. The system of claim 14, wherein the respective first detector and the respective second detector are configured to generate a polarized electric potential on a respective first side thereof and to generate an oppositely-polarized electric potential on a respective second side thereof in response to being deflected toward the respective first side.

16. The system of claim 14, wherein the array of hydrophones is a component of a streamer.

17. The system of claim 14, wherein the array of hydrophones comprises a first sub-array of hydrophones oriented in a first orientation and a second sub-array of hydrophones oriented in a second orientation that is orthogonal to the first orientation.

18. The system of claim 17, wherein the first sub-array comprises a first component of a streamer and the second sub-array comprises a second component of the streamer.

19. The system of claim 17, wherein the first sub-array is a component of a first streamer and the second sub-array is a component of a second streamer.

20. A method to manufacture a geophysical data product, the method comprising:
obtaining geophysical data;
processing the geophysical data to generate the geophysical data product, wherein processing the geophysical data comprises:
measuring a first electric potential generated by a first detector of a hydrophone via a first pair of leads coupled to a housing of the hydrophone and the first detector, wherein the first detector has a first sensitivity;
measuring a second electric potential generated by the second detector of the hydrophone separately from the first electric potential via a second pair of leads coupled to the housing and the second detector, wherein the second detector has a second sensitivity matching the first sensitivity;
isolating a first portion of electric potentials generated by the first detector and the second detector of the hydrophone that is indicative of particle motion; and
isolating a second portion of the electric potentials generated by the first detector and the second detector of the hydrophone that is indicative of pressure; and
recording the geophysical data product on a non-transitory machine-readable medium.

21. The method of claim 20, wherein processing the geophysical data comprises processing the geophysical data offshore or onshore.

* * * * *